(12) United States Patent
Sakakibara et al.

(10) Patent No.: US 11,203,106 B2
(45) Date of Patent: Dec. 21, 2021

(54) SCREW DRIVING TOOL

(71) Applicant: MAKITA CORPORATION, Anjo (JP)

(72) Inventors: Yuji Sakakibara, Anjo (JP); Kazuya Kimura, Anjo (JP); Ryuki Yueda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 273 days.

(21) Appl. No.: 16/279,085

(22) Filed: Feb. 19, 2019

(65) Prior Publication Data

US 2019/0283230 A1    Sep. 19, 2019

(30) Foreign Application Priority Data

Mar. 13, 2018    (JP) ............................. JP2018-045763

(51) Int. Cl.
     *B25F 5/00*         (2006.01)
     *B25B 21/00*      (2006.01)
     *B23B 45/00*      (2006.01)

(52) U.S. Cl.
     CPC ............ *B25F 5/001* (2013.01); *B23B 45/008* (2013.01); *B25B 21/002* (2013.01); *B25F 5/003* (2013.01)

(58) Field of Classification Search
     CPC ........ B25F 5/001; B25F 5/003; B23B 45/008; B25B 21/002; B25B 21/00; B25B 23/0064; B25D 2250/221
     USPC ........................................ 173/2, 11
     See application file for complete search history.

(56) References Cited

U.S. PATENT DOCUMENTS 4,647,260 A     3/1987    O'Hara et al.
5,360,073 A * 11/1994   Akazawa ................ B25B 21/00
                                                    173/15

(Continued)

FOREIGN PATENT DOCUMENTS

CN       101346215 A     1/2009
CN       102528718 A     7/2012

(Continued)

OTHER PUBLICATIONS

Apr. 25, 2021 Office Action issued in Chinese Patent Application No. 201910091849.7.

(Continued)

*Primary Examiner* — Anna K Kinsaul
*Assistant Examiner* — Veronica Martin
(74) *Attorney, Agent, or Firm* — Oliff PLC (57) ABSTRACT

A screw driving includes a housing, a motor, a spindle, a locator, a first detecting mechanism and a controller. The locator is mounted on a front end portion of the housing so as to be movable in a front-rear direction relative to the housing and configured to define a depth to which a screw is driven into a workpiece. The first detecting mechanism is configured to detect a position of the locator in the front-rear direction. The controller is configured to control driving of the motor. Rotational driving of the spindle in a forward direction is started in response to the spindle being pressed rearward, and the rotational driving of the spindle in the forward direction is stopped when the first detecting mechanism detects that the locator is disposed in a specified position rearward of a most forward position within a moving range of the locator.

17 Claims, 6 Drawing Sheets

(56) References Cited

U.S. PATENT DOCUMENTS

| | | | | |
|---|---|---|---|---|
| 5,601,387 | A | * | 2/1997 | Sanford .............. B25B 23/0064 |
| | | | | 408/113 |
| 5,709,275 | A | | 1/1998 | Neumaier |
| 8,944,179 | B2 | * | 2/2015 | Ukai ....................... B25F 5/001 |
| | | | | 173/2 |
| 2012/0160530 | A1 | | 6/2012 | Ikuta et al. |
| 2015/0075827 | A1 | | 3/2015 | Ikuta |
| 2015/0122523 | A1 | * | 5/2015 | Yamamoto .............. B25F 5/001 |
| | | | | 173/2 |
| 2015/0180307 | A1 | | 6/2015 | Nuzuka |

FOREIGN PATENT DOCUMENTS

| | | |
|---|---|---|
| CN | 104626032 A | 5/2015 |
| CN | 104753215 A | 7/2015 |
| JP | S53-127700 U | 10/1978 |
| JP | S63-185589 A | 8/1988 |
| JP | H01-166072 U | 11/1989 |
| JP | H04-336979 A | 11/1992 |
| JP | H05-253854 A | 10/1993 |
| JP | 2004-314206 A | 11/2004 |
| JP | 2015-058517 A | 3/2015 |
| JP | 2015-89611 A | 5/2015 |
| WO | 2008/029513 A1 | 3/2008 |

OTHER PUBLICATIONS

Sep. 1, 2021 Office Action issued in Japanese Patent Application No. 2018-045763.

* cited by examiner

SCREW DRIVING TOOL

CROSS-REFERENCE TO RELATED APPLICATION

The present application claims priority to Japanese patent application No. 2018-45763 filed on Mar. 13, 2018, the contents of which are fully incorporated herein by reference.

TECHNICAL FIELD

The present disclosure relates to a screw driving tool that is configured to drive a screw into a workpiece with a tool accessory.

BACKGROUND ART

A screw driving tool is known in which a spindle is rotationally driven when a screw engaged with a tool accessory is pressed against a workpiece, and the rotational driving of the spindle is stopped when the screw is driven into the workpiece up to a depth defined by a locator. For example, in a screwdriver disclosed in Japanese laid-open patent publication No. 2015-89611, a driving member is engaged with a driven member in response to a rearward movement of the spindle, so that power of the motor is transmitted to the spindle. After the locator comes into abutment with the workpiece, the spindle is moved forward and the driving member is disengaged from the driven member, thereby power transmission to the spindle is interrupted.

SUMMARY

As described above, the screwdriver disclosed in Japanese laid-open patent publication No. 2015-89611 is capable of appropriately starting and stopping the rotational driving of the spindle with a clutch mechanism which is configured to operate according to the movement of the spindle in the front-rear direction. On the other hand, it may be desirable if the rotational driving of the spindle can be stopped at an appropriate timing, regardless of presence or absence of the clutch mechanism.

Accordingly, it is an object of the present disclosure to provide a screw driving tool having a rational structure which is configured to stop rotational driving of a spindle at an appropriate timing in a screw-driving operation.

According to one aspect of the present disclosure, a screw driving tool is provided which is configured to drive a screw into a workpiece with a tool accessory. The screw driving tool includes a housing, a motor, a spindle, a locator, a first detecting mechanism and a controller.

The housing extends in a front-rear direction of the screw driving tool. The motor is housed in the housing. The spindle is an elongate member extending in the front-rear direction along a drive axis and supported by the housing so as to be rotatable around the drive axis. The spindle has a front end portion which is configured to detachably hold the tool accessory. Further, the spindle is configured to be rotationally driven at least in a forward direction by power transmitted from the motor. The forward direction corresponds to a direction of tightening the screw with the tool accessory. The locator is mounted on a front end portion of the housing so as to be movable in the front-rear direction relative to the housing. Further, the locator is configured to define a depth to which the screw is driven into the workpiece. The first detecting mechanism is configured to detect a position of the locator in the front-rear direction. The controller is configured to control driving of the motor.

Further, the screw driving tool is configured such that rotational driving of the spindle in the forward direction is started in response to the spindle being pressed rearward via the tool accessory, and such that the rotational driving of the spindle in the forward direction is stopped when the first detecting mechanism detects that the locator is disposed in a specified position, which is located rearward of a most forward position within a moving range of the locator.

In the preset aspect, the rotational driving of the spindle may be started, for example, by starting driving the motor or by starting power transmission from the motor to the spindle. Likewise, rotational driving of the spindle may be stopped by stopping driving of the motor or by interrupting power transmission from the motor to the spindle.

In the screw driving tool according to the present aspect, the locator is mounted on the front end portion of the housing so as to be movable in the front-rear direction relative to the housing. Further, the screw driving tool is provided with the first detecting mechanism configured to detect the front-rear position of the locator. When the screw is gradually driven into the workpiece and the locator comes into abutment with the workpiece, the locator is pressed against the workpiece and moved rearward relative to the housing. When the locator is moved up to the specified position, this is detected by the detecting mechanism and rotational driving of the spindle is stopped. Thus, in the screw-driving operation, the screw driving tool of the present aspect is capable of stopping the rotational driving of the spindle based on a detecting result of the detecting mechanism regarding the front-rear position of the locator. With such a structure, the rotational driving of the spindle for the screw-driving operation can be stopped at an appropriate timing regardless of presence or absence of the clutch mechanism.

In one aspect of the present disclosure, the screw driving tool may further include an operating member configured to be depressed by a user. Further, the controller may be configured to start driving the motor when the operating member is depressed and the spindle is pressed rearward via the tool accessory. It is noted that no specific order is required for the actions of depressing the operating member and pressing the spindle rearward.

In one aspect of the present disclosure, the controller may be configured to stop driving the motor when the first detecting mechanism detects that the locator is disposed in the specified position.

In one aspect of the present disclosure, the screw driving tool may further include an operating member and a direction selecting member. The operating member may be configured to be depressed by a user. The direction selecting member may be configured to select, by way of the user's operation, a rotating direction of the spindle between the forward direction and a reverse direction. The reverse direction corresponds to a direction of loosening the screw with the tool accessory. The controller may be configured to start driving the motor when the operating member is depressed and the spindle is pressed rearward via the tool accessory, in a case where the selected rotating direction is the forward direction, thereby starting rotational driving of the spindle in the forward direction. Further, the controller may be configured to start driving the motor only in response to the operating member being depressed, in a case where the selected rotating direction is the reverse direction, thereby starting rotational driving of the spindle in the reverse direction.

In one aspect of the present disclosure, the screw driving tool may further include a second detecting mechanism configured to detect that the spindle is pressed rearward.

In one aspect of the present disclosure, the controller may be configured to start driving the motor in response to the spindle being pressed rearward via the tool accessory, thereby starting rotational driving of the spindle in the forward direction, and to stop driving the motor when the detecting mechanism detects that the locator is located in the specified position, thereby stopping rotational driving of the spindle in the forward direction.

In one aspect of the present disclosure, the screw driving tool may further include a clutch mechanism. The clutch mechanism may be disposed on a transmission path of the power from the motor to the spindle. The clutch mechanism may be configured to be switched between a transmission-enabled state, in which the clutch mechanism is capable of transmitting the power of the motor to the spindle, and a transmission-disabled state, in which the clutch mechanism is incapable of transmitting the power of the motor to the spindle.

In one aspect of the present disclosure, the clutch mechanism may be configured to be held in the transmission-disabled state when the spindle is not pressed rearward. The clutch mechanism may be further configured to be switched to the transmission-enabled state in response to the spindle being pressed rearward via the tool accessory.

In one aspect of the present disclosure, the clutch mechanism may be configured to be electrically switched between the transmission-enabled state and the transmission-disabled state. The controller may be configured to electrically switch the clutch mechanism to the transmission-disabled state when the first detecting mechanism detects that the locator is disposed in the specified position.

In one aspect of the present disclosure, the screw driving tool may further include a second detecting mechanism configured to detect that the spindle is pressed rearward. The controller may be configured to electrically switch the clutch mechanism to the transmission-enabled state when the second detecting mechanism detects that the spindle is pressed rearward.

In one aspect of the present disclosure, the clutch mechanism may include an electromagnetic clutch.

In one aspect of the present disclosure, the controller may be configured to start driving the motor only in response to the operating member being depressed and stop driving the motor only in response to the operating member being released in a case where the selected rotating direction is the reverse direction.

In one aspect of the present disclosure, the first detecting mechanism may be disposed within the housing.

DETAILED DESCRIPTION OF THE EMBODIMENTS

A screwdriver 1 according to an embodiment is now described with reference to the drawings. The screwdriver 1 is an example of a screw driving tool which is capable of performing a screw-driving operation of driving a screw 97 engaged with a driver bit 90 into a workpiece 99 and a screw-loosening operation of loosening and removing a screw 97 screwed into a workpiece 99, by rotationally driving the driver bit 90 coupled to a spindle 3.

Figure 1:
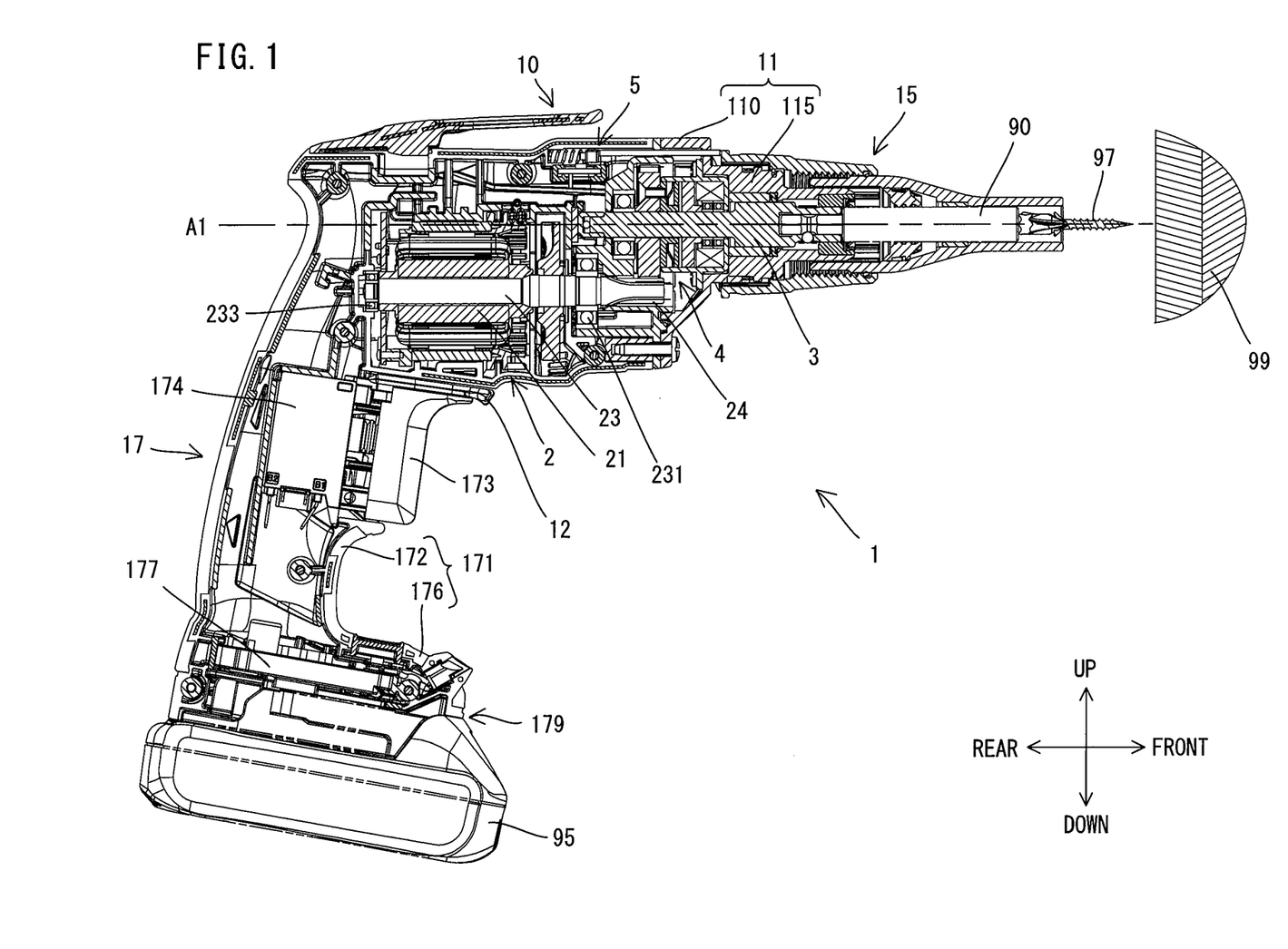
FIG. 1 is a sectional view of a screwdriver.

The general structure of the screwdriver 1 is now described. As shown in FIG. 1, the screwdriver 1 mainly includes a body 10 and a handle 17.

An outer shell of the body 10 is mainly formed by a body housing 11 and a locator 15. The body housing 11 is configured as an elongate hollow body extending along a specified drive axis A1. The body housing 11 houses a motor 2, the spindle 3 and a driving mechanism 4. The body housing 11 includes a generally rectangular box-like driving-mechanism-housing part 110 and a generally cylindrical locator-mounting part 115. The locator-mounting part 115 has a smaller diameter than the driving-mechanism-housing part 110 and protrudes along the drive axis A1 from one end portion (an axial end portion) of the driving-mechanism-housing part 110 in an extending direction (axial direction) of the drive axis A1. The locator 15 has a cylindrical shape and is mounted on the locator-mounting part 115. The driver bit 90, which is coupled to the spindle 3, extends within the locator 15.

An outer shell of the handle 17 is formed by a handle housing 171. The handle housing 171 protrudes in a direction crossing the drive axis A1 (specifically, in a direction generally orthogonal to the drive axis A1) from the other axial end portion of the driving-mechanism-housing part 110 (on the side opposite to the locator-mounting part 115). The handle housing 171 includes a cylindrical grip part 172 to be held by a user and a rectangular box-like controller-housing part 176.

A trigger 173 is provided on a base end portion (which is connected to the driving-mechanism-housing part 110) of the grip part 172 and configured to be depressed (pulled) by the user. The trigger 173 is normally held in an initial position by a biasing member (not shown) and configured to be turned rearward by a depressing operation. A switch 174 is housed within the grip part 172. The switch 174 is normally held in an off state. The switch 174 is configured to be switched on while the trigger 173 is kept depressed by the depressing operation (the rearward movement) of the trigger 173. The controller-housing part 176 houses a controller 177. A battery-mounting part 179 is provided on the controller-housing part 176 such that a rechargeable battery 95 is removably mounted to the battery-mounting part 179. In the present embodiment, the controller 177 is configured as a microcomputer including a CPU, a ROM and a RAM and connected to the switch 174 via a wiring (not shown).

In the present embodiment, the controller 177 is configured to control operations of the motor 2 and the driving mechanism 4 according to whether or not the trigger 173 is depressed, whether or not the spindle 3 is pressed, and the position of the locator 15 in the front-rear direction. The screw driving or loosening operation may be performed by such control.

The detailed structure of the screwdriver 1 is now described. In the following description, for convenience sake, the extending direction of the drive axis A1 is defined as a front-rear direction of the screwdriver 1. In the front-rear direction, the locator 15 side is defined as a front side and the opposite side (where the handle housing 171 is connected to the body housing 11) is defined as a rear side. Further, a direction which is orthogonal to the drive axis A1 and which corresponds to the extending direction of the handle housing 171 is defined as an up-down direction. In the up-down direction, the trigger 173 side is defined as an upper side and the battery-mounting part 179 side is defined as a lower side. A direction orthogonal to the front-rear direction and the up-down direction is defined as a left-right direction.

First, the internal structure of the body housing 11 is described. As shown in FIG. 1, the body housing 11 houses the motor 2, the spindle 3, the driving mechanism 4 and a detecting mechanism 5.

The motor 2 is now described. In the present embodiment, a compact, high-output DC brushless motor is employed as the motor 2. The motor 2 is housed in a rear lower portion of the body housing 11 (specifically, of the driving-mechanism-housing part 110). A motor shaft 23 extends from a rotor 21 in parallel to the drive axis A1 (in the front-rear direction) below the drive axis A1. The motor shaft 23 is configured to rotate together with the rotor 21. The motor shaft 23 is rotatably supported at front and rear end portions by bearings 231, 233 which are held by the body housing 11. A pinion gear 24 is formed on the front end portion of the motor shaft 23.

The rotating direction of the motor shaft 23 can be switched according to a position of a changeover switch 12 which is provided on a lower end portion (above the trigger 173) of the body housing 11 (the driving-mechanism-housing part 110). Specifically, by turning the changeover switch 12 to the left or right, the user can select the rotating direction of the motor shaft 23 (the rotating direction of the spindle 3) either to a direction of driving (tightening) the screw 97 with the driver bit 90 (also referred to as a forward direction or a screw-tightening direction) or to a direction of loosening the screw 97 with the driver bit 90 (also referred to as a reverse direction or a screw-loosening direction). The controller 177 is configured to control driving of the motor 2 according to the rotating direction set with the changeover switch 12.

Figure 2:
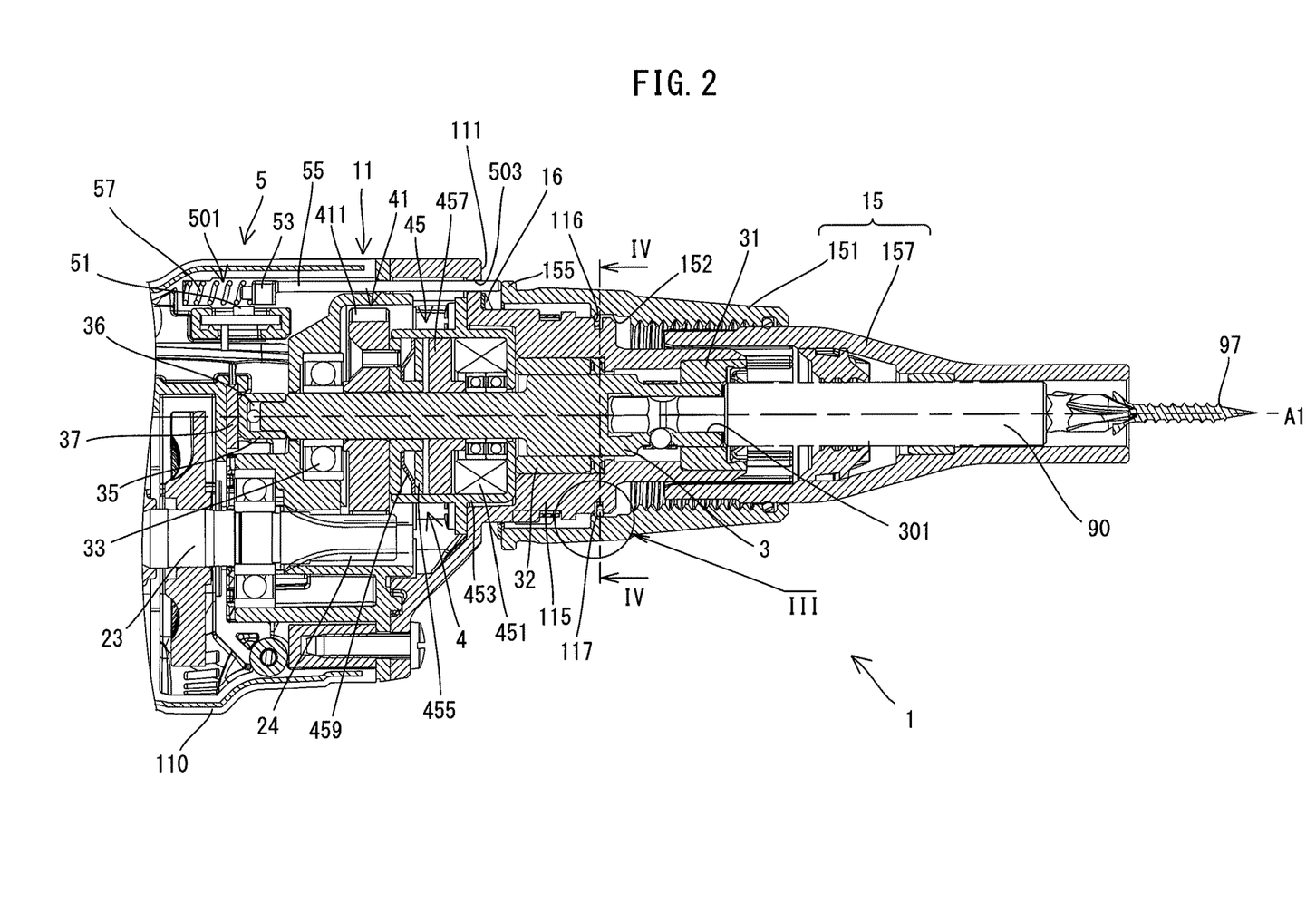
FIG. 2 is a partial, enlarged view of FIG. 1.

Next, the spindle 3 is described. As shown in FIG. 2, the spindle 3 is a generally cylindrical elongate member extending in the front-rear direction along the drive axis A1 within the body housing 11 (specifically, from a front portion of the driving-mechanism-housing part 110 to the locater mounting part 115). The spindle 3 is supported at front end, center and rear end portions by three bearings 31, 32, 33, which are held by the body housing 11, so as to be rotatable around the drive axis A1.

A bit-insertion hole 301 is formed in the front end portion of the spindle 3 and extends along the drive axis A1. A smaller-diameter portion of the driver bit 90 is inserted into the bit-insertion hole 301, and the driver bit 90 is detachably held by engagement between the small-diameter portion and a steel ball biased by a leaf spring. The rear end portion of the spindle 3 is covered by a cap 35. A thrust bearing 36 is disposed between the cap 35 and the rear end of the spindle 3. The thrust bearing 36 is configured to receive an axial load while allowing rotation of the spindle 3. Further, a force sensor 37 is disposed on the rear side of the cap 35 and held by the body housing 11. The force sensor 37 is configured to measure a rearward pressing force (load) applied to the spindle 3. The force sensor 37 is connected to the controller 177 (see FIG. 1) via a wiring (not shown) and configured to output a signal corresponding to the measured pressing force to the controller 177. A piezoelectric type or strain gauge type sensor, for example, can be employed as the force sensor 37. The pressing force measured by the force sensor 37 is used to detect that the spindle 3 is pressed rearward via the driver bit 90, which will be described in detail later.

The driving mechanism 4 is now described. The driving mechanism 4 is configured to rotationally drive the spindle 3 by power of the motor 2. The driving mechanism 4 of the present embodiment includes the above-mentioned pinion gear 24, an intermediate gear member 41 and a clutch mechanism 45.

The intermediate gear member 41 is disposed radially outside of the rear end portion of the spindle 3, so as to be rotatable around the drive axis A1 relative to the spindle 3. Gear teeth 411 are formed on the outer periphery of the intermediate gear member 41. The gear teeth 411 are engaged with the pinion gear 24 of the motor shaft 23. Therefore, when the motor shaft 23 is rotationally driven, the intermediate gear member 41 is also rotationally driven.

The clutch mechanism 45 is provided on a power transmission path from the motor 2 to the spindle 3. The clutch mechanism 45 is configured to transmit the power of the motor 2 to the spindle 3 or interrupt the power transmission. In the present embodiment, the clutch mechanism 45 is configured as a friction type electromagnetic clutch which is configured to transmit and interrupt power by utilizing electromagnetic force. The clutch mechanism 45 includes an annular coil 451, a holding member 453 for holding the coil 451, a disc-like driving member 455, a disc-like driven member 457, and a flat spring 459.

The holding member 453 is fixed to the body housing 11 so as not to be rotatable around the drive axis A1. The coil 451 is built in the holding member 453. Further, the spindle 3 is rotatably supported by two bearings which are disposed on the inner peripheral side of the coil 451. The driving member 455 is mounted on a front side of the intermediate gear member 41 via the flat spring 459 and rotates together with the intermediate gear member 41. The driven member 457 is fixed to the spindle 3 behind the coil 451 and in front of the driving member 455 and rotates together with the spindle 3.

As shown in FIG. 2, when the coil 451 is not excited, the driving member 455 is held by the flat spring 459 at a position slightly apart rearward from the driven member 457. Thus, a front surface of the driving member 455 and a rear surface of the driven member 457 are opposed to each other in the front-rear direction. The front surface of the driving member 455 and the rear surface of the driven member 457 are configured as power transmission surfaces to transmit power by engaging in friction contact with each other. When the coil 451 is not excited, the front surface of the driving member 455 and the rear surface of the driven member 457 are not engaged with each other, and the clutch mechanism 45 is incapable of transmitting the power of the motor 2 to the spindle 3. This state is hereinafter referred to as a transmission-disabled state.

Figure 5:
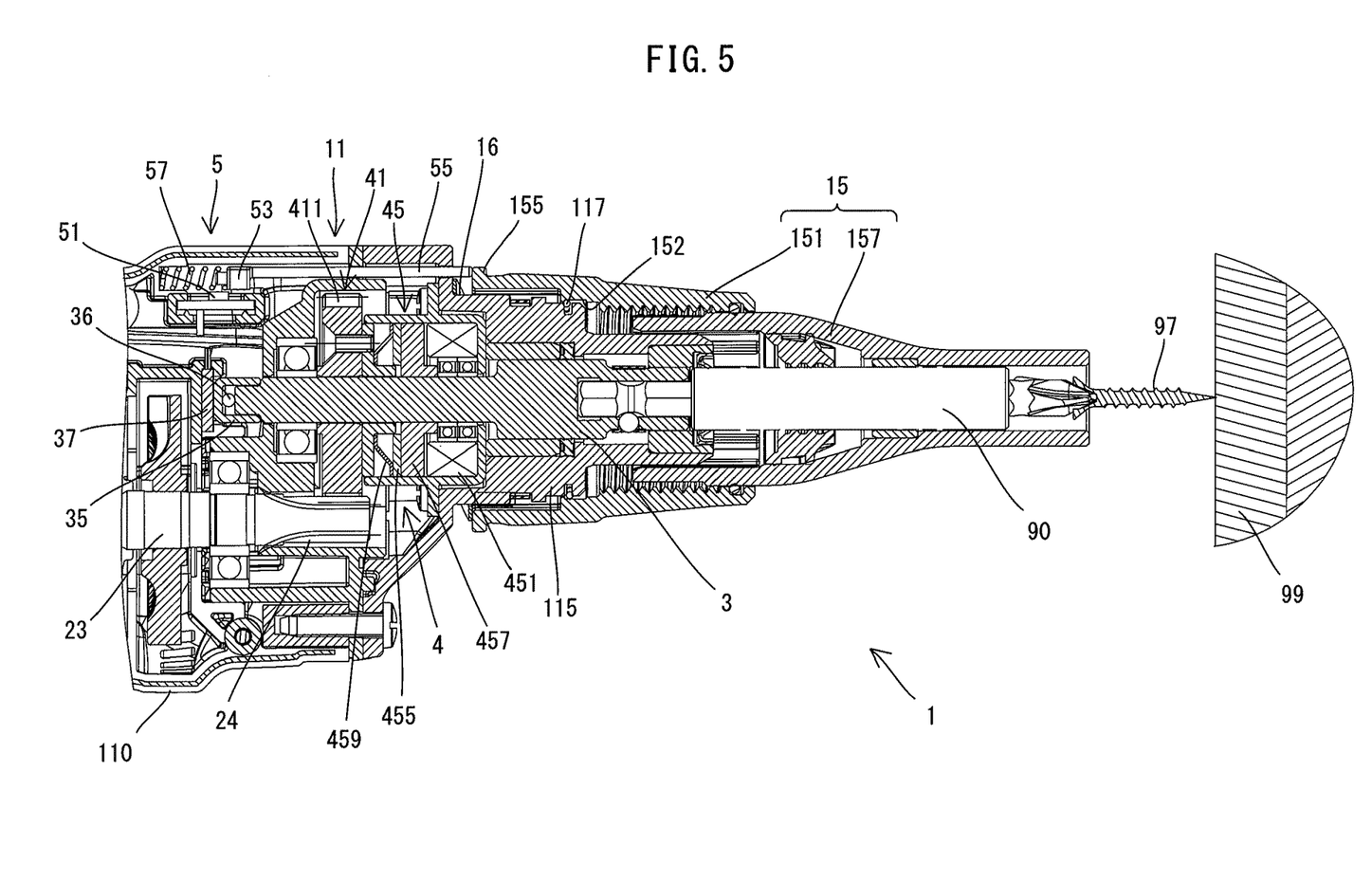
FIG. 5 is an explanatory drawing for illustrating the screwdriver in a state in which the clutch mechanism is turned to a transmission-enabled state in response to a spindle being pressed rearward.

When the controller 177 (see FIG. 1) energizes and excites the coil 451, the driving member 455 is attracted toward the driven member 457 (forward) by an electromagnetic force generated by the coil 451, so that the front surface of the driving member 455 is engaged (in friction contact) with the rear surface of the driven member 457, as shown in FIG. 5. Thus, torque of the driving member 455 can be transmitted to the driven member 457. In other words, the clutch mechanism 45 is capable of transmitting the power of the motor 2 to the spindle 3. This state is hereinafter referred to as a transmission-enabled state. When the controller 177 stops energization to the coil 451, the driving member 455 is returned to the position apart rearward from the driven member 457 by the flat spring 459, so that the clutch mechanism 45 is turned to the transmission-disabled state. Control of energization to the coil 45 (control of operation of the clutch mechanism 45) by the controller 177 will be described in detail later.

The locator 15 and the detecting mechanism 5 are now described.

As shown in FIG. 2, the locator 15 is mounted on the body housing 11 so as to cover the locator-mounting part 115 of the body housing 11. The locator 15 is configured to define a depth (hereinafter referred to as a screwing depth) to which the screw 97 is to be screwed into the workpiece 99. More specifically, the locator 15 of the present embodiment includes a base part 151 and an adjusting part 157.

The base part 151 has a generally cylindrical shape and is mounted to cover an outer periphery of the locator-mounting part 115 of the body housing 11. The adjusting part 157 has a cylindrical shape tapered forward. A rear portion of the adjusting part 157 is engaged with a female threaded part formed in a front portion of the base part 151. When the adjusting part 157 and the base part 151 are turned around the drive axis A1 relative to each other by the user, the adjusting part 157 moves in the front-rear direction relative to the base part 151. Thus, the user can adjust the screwing depth by adjusting the amount of protrusion of the adjusting part 157 from the base part 151.

Figure 3:
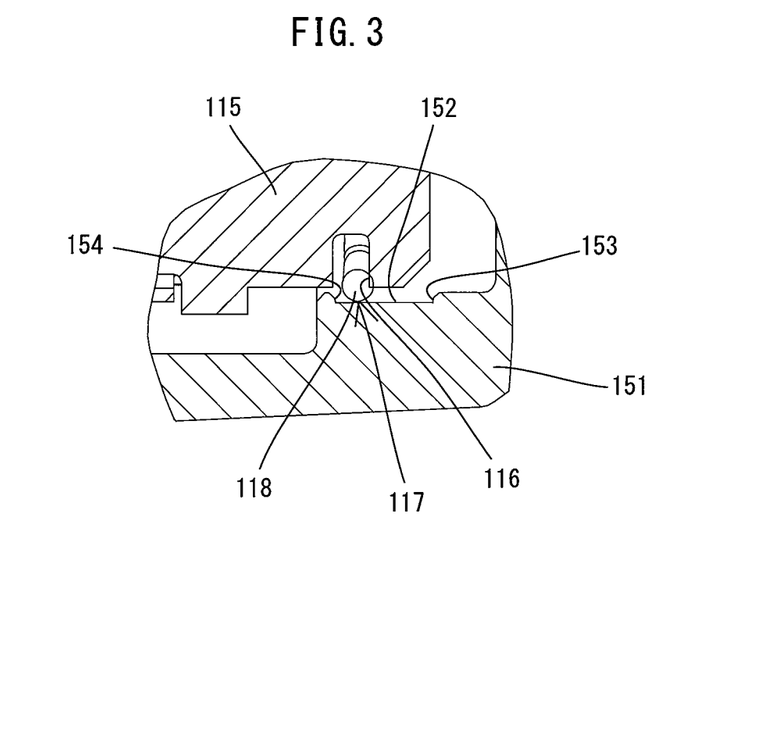
FIG. 3 is an enlarged view of a region III shown in FIG. 2
Figure 4:
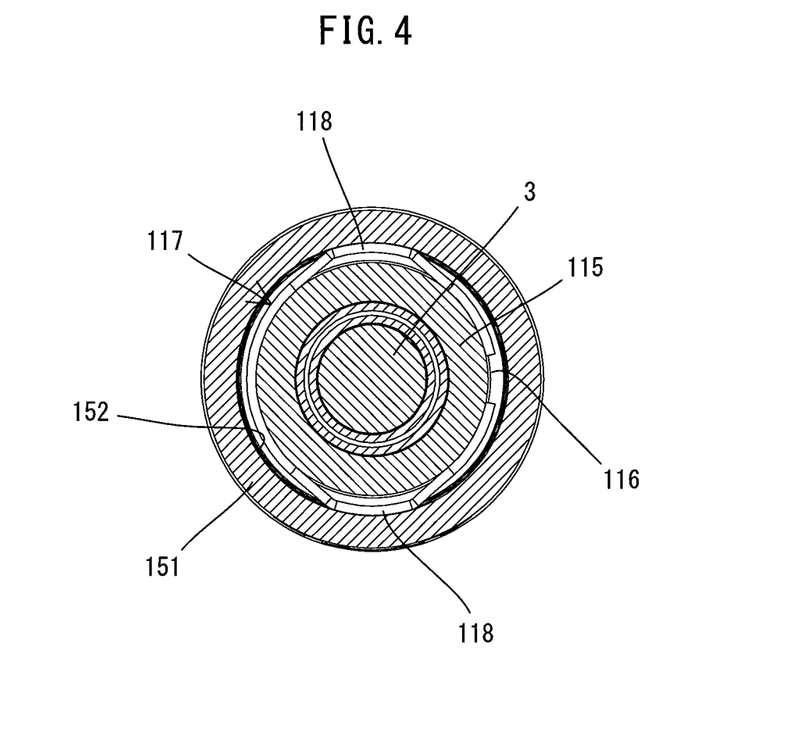
FIG. 4 is a sectional view taken along line IV-IV in FIG. 2.

Further, in the present embodiment, the locator 15 is connected to the body housing 11 so as to be movable in the front-rear direction relative to the body housing 11. More specifically, as shown in FIGS. 2 and 3, an annular groove 116 is formed all around an outer periphery of the locator-mounting part 115 of the body housing 11. As shown in FIGS. 3 and 4, a stopper member 117 is engaged in the groove 116. The stopper member 117 is configured to prevent the locator 15 from slipping off from the locator-mounting part 115. In the present embodiment, the stopper member 117 is a generally C-shaped spring member formed of wire. Most of the stopper member 117 is disposed within the groove 116, but upper and lower portions of the stopper member 117 protrude outward from the groove 116 and each form a protruding part 118. Correspondingly, as shown in FIGS. 2 and 3, an annular recess 152 is formed in an inner periphery of a central portion of the base part 151. The recess 152 is recessed radially outward and has a specified width which is larger than the width of the protruding part 118 in the front-rear direction. In the present embodiment, by way of example, the recess 152 has a width of about 2 millimeters (mm) in the front-rear direction. The protruding part 118 of the stopper member 117 protrudes into the recess 152.

With such a structure, the locator 15 is allowed to move in the front-rear direction relative to the body housing 11 while an inner peripheral surface of the locator 15 slide in a partial contact with an outer peripheral surface of the locator-mounting part 115, within a moving range of the protruding part 118 in the recess 152 (between a position where the protruding part 118 abuts on a front wall 153 defining a front end of the recess 152 and a position where the protruding part 118 abuts on a rear wall 154 defining a rear end of the recess 152).

Further, as shown in FIG. 2, a rear end portion of the base 151 is configured as a flange 155 having a larger outer diameter than the other portions of the base 151. A biasing member 16 is disposed between a front end surface 111 of the driving-mechanism-housing part 110 of the body housing 11 and a rear end surface of the base part 151 (the flange 155). In the present embodiment, the biasing member 16 is configured as an annular wave washer and fitted onto the locator-mounting part 115. Alternatively, the biasing member 16 may be configured as an elastic member (preferably a spring member) other than a wave washer. The locator 15 is biased forward by the biasing member 16, and normally (that is, when the locator 15 is not pressed rearward) held in a most forward position within a moving range of the locator 15 (specifically, the position where the protruding part 118 abuts on the rear wall 154). When the screw-driving operation proceeds and the locator 15 abuts on the workpiece 99, the locator 15 is pressed rearward and moved rearward from the most forward position against the biasing force of the biasing member 16, which will be described in further detail later.

As shown in FIG. 2, the detecting mechanism 5 is disposed within an upper end portion of the body housing 11 (specifically, of the driving-mechanism-housing part 110). The detecting mechanism 5 is configured to detect the front-rear position of the locator 15 relative to the body housing 11. More specifically, the detecting mechanism 5 of the present embodiment is configured to detect that the locator 15 is disposed in a specified position which is located rearward of the above-described most forward position. The detecting mechanism 5 includes a position sensor 51, a magnet 53, an actuation rod 55 and a biasing member 57.

The position sensor 51 is a sensor which includes a Hall element. The position sensor 51 is configured to detect the magnet 53 disposed within a specified detection range. The position sensor 51 is mounted on a circuit board and held in the upper end portion of the driving-mechanism-housing part 110 above the rear end portion of the spindle 3. The position sensor 51 is connected to the controller 177 via a wiring (not shown) and configured to output a specific detection signal (hereinafter referred to as an ON signal) to the controller 177 upon detecting the magnet 53.

A housing space 501 for the magnet 53 and the biasing member 57 is formed between the position sensor 51 and an upper wall of the driving-mechanism-housing part 110 (above the position sensor 51) in the up-down direction. A passage is formed to extend forward from the housing space 501 in the front-rear direction. The actuation rod 55 is an elongate rod-like member and is disposed within this passage so as to be slidable in the front-rear direction. An outer edge of the flange 155 of the locator 15 is oppositely arranged in front of an exit (that is, an opening in the front end surface 111 of the driving-mechanism-housing part 110) 503 of the passage. The magnet 53 is fixed to a rear end portion of the actuation rod 55. The biasing member 57 is disposed within the housing space 501 such that a rear end of the biasing member 57 is held in abutment with a wall surface defining a rear end of the housing space 501 and a front end of the biasing member 57 is held in abutment with the magnet 53.

With such a structure, the actuation rod 55 is biased forward by the biasing member 57 and held in a position where the front end of the actuation rod 55 protrudes forward from the opening 503 and comes into abutment with a rear end surface of the flange 155. As shown in FIG. 2, when the locator 15 is disposed in the most forward position, the actuation rod 55 and the magnet 53 are also disposed in their respective most forward positions within their respective moving ranges. At this time, the magnet 53 is disposed forward outside the detection range of the position sensor 51. When the locator 15 is moved rearward from the most forward position, the flange 155 presses the actuation rod 55 rearward, and thus the actuation rod 55 and the magnet 53 are moved rearward against a biasing force of the biasing member 57. When the locator 15 is moved up to the specified position, the magnet 53 enters the detection range of the position sensor 51. In response to the entry, the position sensor 51 outputs an ON signal to the controller 177. In the present embodiment, the detecting mechanism 5 is configured such that the position sensor 51 detects the magnet 53 when the locator 15 is disposed in a rearmost position within the moving range.

Operation of the screwdriver 1 is now described.

First, when the trigger 173 is not depressed and no external rearward force is applied to the spindle 3, as shown in FIG. 2, the locator 15, the actuation rod 55 and the magnet 53 are disposed in the respective most forward positions, and the clutch mechanism 45 is in the transmission-disabled state.

When the rotating direction of the motor shaft 23 (the spindle 3) is set to the forward direction (the screw-tightening direction) with the changeover switch 12, the screwdriver 1 operates as follows to perform the screw-driving operation.

As shown in FIG. 5, when the screw 97 is engaged with the driver bit 90 and the screw 97 is pressed against the workpiece 99, the spindle 3 is pressed rearward via the screw 97 and the driver bit 90. When a signal from the force sensor 37 indicates that the pressing force on the spindle 3 exceeds a specified threshold, the controller 177 (see FIG. 1) determines that the spindle 3 is pressed rearward. Further, when a signal indicating an on state (hereinafter referred to as an ON signal) is outputted from the switch 174, the controller 177 determines that the trigger 173 is depressed.

In a case where the trigger 173 is depressed and the spindle 3 is pressed rearward via the driver bit 90, the controller 177 starts driving the motor 2. The controller 177 also starts energization to the coil 451 and thereby puts the clutch mechanism 45 into the transmission-enabled state. Then, torque of the motor shaft 23 is transmitted to the spindle 3 via the pinion gear 24, the intermediate gear member 41, the driving member 455 and the driven member 457, and the spindle 3 is rotationally driven in the forward direction. Thus, the screw 97 is driven into the workpiece 99.

Figure 6:
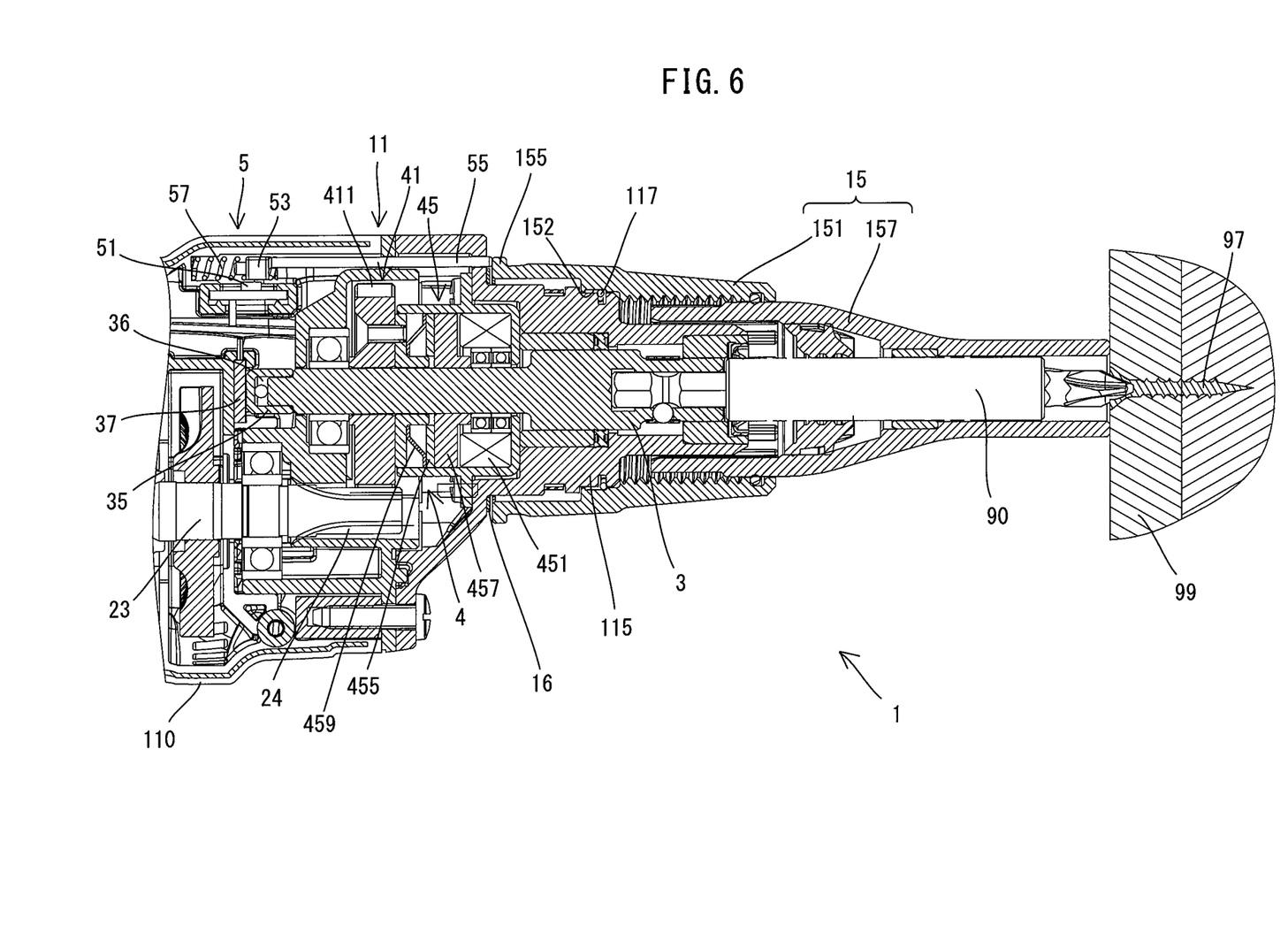
FIG. 6 is an explanatory drawing for illustrating the screwdriver in a state in which a locator is disposed in a rearmost position.
Figure 7:
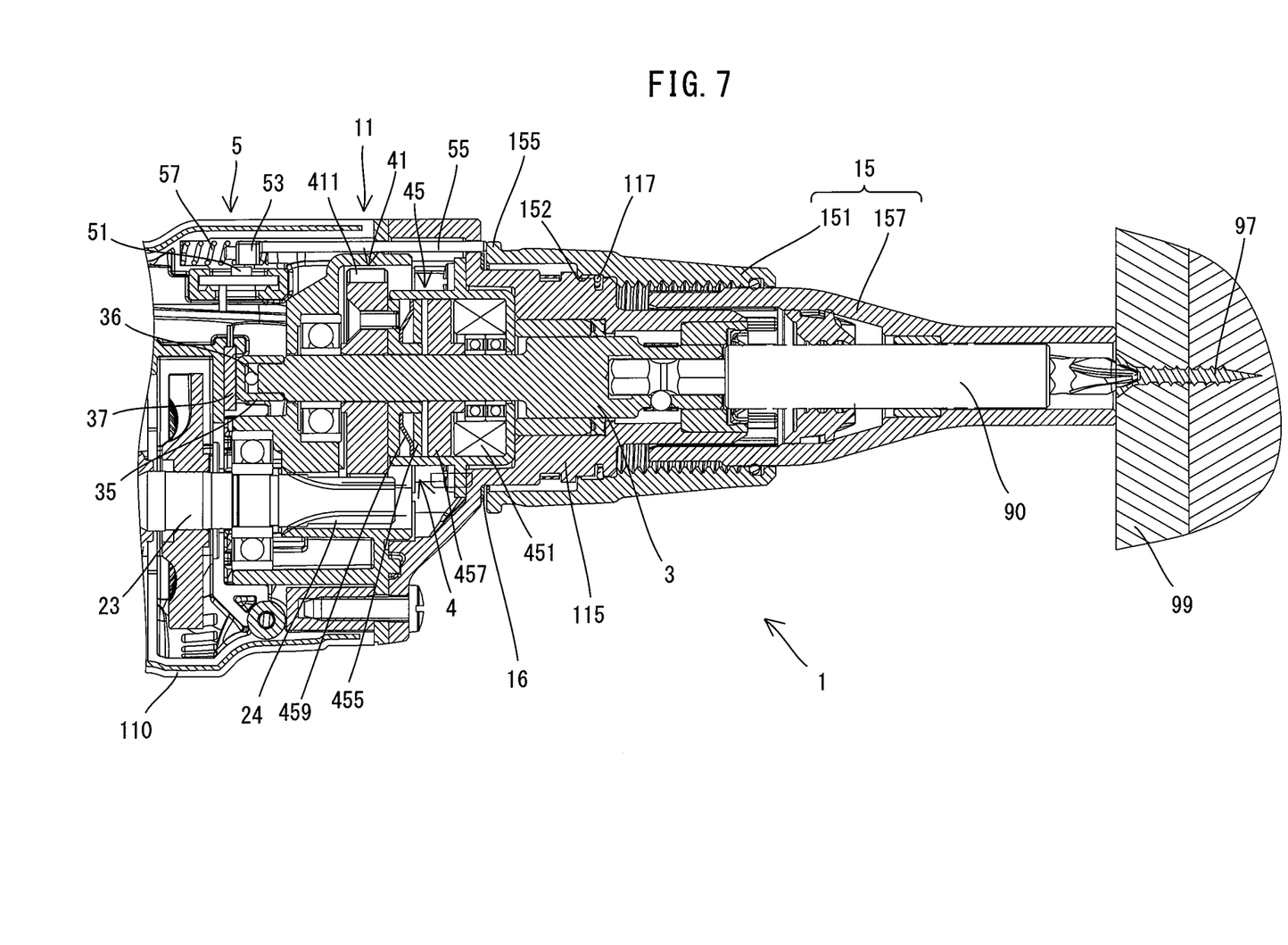
FIG. 7 is an explanatory drawing for illustrating the screwdriver in a state in which the clutch mechanism is turned to a transmission-disabled state in response to the locator being disposed in the rearmost position.

As the screw 97 is driven into the workpiece 99, the body housing 11 and the locator 15 gradually move in a direction (forward) toward the workpiece 99 until a front end surface of the locator 15 comes into abutment with the workpiece 99. Upon the abutment, an area which is subjected to the rearward pressing force in the screwdriver 1 shifts from the spindle 3 to the locator 15. The locator 15 is pressed against the workpiece 99 and pressed rearward, thereby moving rearward relative to the body housing 11 against the biasing force of the biasing member 16. Along with this movement, the driver bit 90 further drives the screw 97 into the workpiece 99, while a tip of the driver bit 90 relatively moves forward of the front end surface of the locator 15. As shown in FIG. 6, the locator 15 is moved up to the rearmost position while the screw 97 is driven into the workpiece 99 up to the depth defined by the locator 15. When the position sensor 51 detects the magnet 53 and outputs an ON signal to the controller 177, the controller 177 stops driving the motor 2 and stops energization to the coil 451. Then, as shown in FIG. 7, the driving member 455 is returned to the position apart from the driven member 457, so that the clutch mechanism 45 is put into the power transmission-disabled state. Thus, the rotational driving of the spindle 3 is stopped and the screw-driving operation is completed.

When the rotating direction of the motor shaft 23 (the spindle 3) is set to the reverse direction (the screw loosening direction) with the changeover switch 12, the screwdriver 1 operates as follows to perform the screw-loosening operation.

When the trigger 173 is depressed by a user, an ON signal is outputted to the controller 177 from the switch 174. In response to this signal, the controller 177 starts driving the motor 2 and starts energization to the coil 451, thereby putting the clutch mechanism 45 into the transmission-enabled state. Therefore, when the trigger 173 is depressed while the driver bit 90 is engaged with the screw 97 screwed into the workpiece 99, the spindle 3 is rotationally driven in the reverse direction. Thus, the screw 7 is loosened and removed from the workpiece 99.

When the driver bit 90 is engaged with the screw 97 screwed into the workpiece 99, a rearward pressing force may be applied to the spindle 3 via the driver bit 90, or the locator 15 may be pushed rearward by the workpiece 99. In the present embodiment, however, in the screw-loosening operation, unlike in the screw-driving operation, the controller 177 starts driving the motor 2 only in response to the trigger 173 being depressed (the switch 174 being turned on), regardless of whether or not the spindle 3 is pressed (that is, regardless of the measurement result of the pressing force on the spindle 3 by the force sensor 37) and regardless of the position of the locator 15 (that is, regardless of the detection result of the magnet 53 by the position sensor 51). When the trigger 173 is released and the switch 174 is turned off, the controller 177 stops driving the motor 2 and stops energization to the coil 451, thereby putting the clutch mechanism 45 into the power transmission-disabled state. Thus, the rotational driving of the spindle 3 is stopped, so that the screw-loosening operation is completed.

As described above, in the screwdriver 1 according to the present embodiment, the locator 15 is mounted on the front end portion (the locator-mounting part 115) of the body housing 11 so as to be movable in the front-rear direction relative to the body housing 11. Further, the screwdriver 1 is provided with the detecting mechanism 5 configured to detect the front-rear position of the locator 15. In the screw-driving operation, when the screw 97 is driven into the workpiece 99 up to the depth defined by the locator 15, the rotational driving of the spindle 3 can be stopped based on the detection result of the detecting mechanism 5 (specifically, in response to an ON signal from the position sensor 51).

Particularly, in the present embodiment, the screwdriver 1 is provided with the clutch mechanism 45 configured as an electromagnetic clutch. The controller 177 stops the rotational driving of the spindle 3 by stopping driving the motor 2 as well as electrically switching the clutch mechanism 45 to the transmission-disabled state. Thus, the rotational driving of the spindle 3 can be promptly and reliably stopped, and power consumption and noise which may otherwise be caused by unnecessarily continued driving of the motor 2 can be suppressed.

Further, in the present embodiment, in the screw-driving operation in which the spindle 3 is rotationally driven in the forward direction, the controller 177 starts driving the motor 2 when the trigger 173 is depressed and also the spindle 3 is pressed rearward via the driver bit 90. In other words, the motor 2 is not driven when only the operating member is depressed, or when only the spindle is pressed rearward. The motor 2 is driven only when the both actions for starting the screw-driving operation are definitely performed by the user. This can reduce the possibility of the spindle 3 being rotationally driven when not intended by the user. On the other hand, in the screw-loosening operation in which the spindle 3 is rotationally driven in the reverse direction, the controller 177 starts driving the motor 2 only in response to the trigger 173 being depressed. Therefore, in the screw-loosening operation which does not require a pressing force on the spindle 3 so much as in the screw-driving operation, the rotational driving of the spindle 3 can be promptly started.

The above-described embodiment is given as a mere example and a screw driving tool according to the present invention is not limited to the screwdriver 1 of the above-described embodiment. For example, the following modifications may be made. Further, one or more of these modifications may be employed in combination with the screwdriver 1 of the above-described embodiment or the claimed invention.

For example, the screwdriver 1 of the above-described embodiment may be configured such that the clutch mechanism 45 is omitted and the intermediate gear member 41 is fixed to the spindle 3 and rotates together with the spindle 3. In other words, the driving mechanism 4 may be formed by the pinion gear 24 and the intermediate gear member 41. In this case, start and stop of the rotational driving of the spindle 3 may be interlocked with start and stop of driving of the motor 2. The controller 177 may be configured to start driving the motor 2 in response to the spindle 3 being pressed rearward, and to stop driving the motor 2 when the detecting mechanism 5 detects that the locator 15 is located in the rearmost position. It is noted that the controller 177 may simply stop energization to the motor 2 to stop the rotational driving of the spindle 3. Preferably, however, the controller 177 may stop the motor 2 while electrically braking the motor 2, in order to suppress further rotation of the motor 2 due to inertia, which leads to continuing rotational driving of the spindle 3. In the present modification, even without providing the clutch mechanism 45, the rotational driving of the spindle 3 can be stopped at an appropriate timing based on the detection result of the detecting mechanism 5 like in the above-described embodiment. Further, size reduction and weight reduction of the driving mechanism 4 and thus of the whole screwdriver 1 can be realized by omission of the clutch mechanism 45.

Further, the timing of starting and stopping driving the motor 2 and the timing of switching the clutch mechanism 45 between the transmission-enabled state and the transmission-disabled state (that is, the timing of starting and stopping energization to the coil 451) may be appropriately changed. For example, the controller 177 may start driving the motor 2 when the switch 174 is turned on in response to the trigger 173 being depressed, and switch the clutch mechanism 45 to the transmission-enabled state when a pressing force which is measured by the force sensor 37 in response to the spindle 3 being pressed rearward exceeds a specified threshold. In this case, when the trigger 173 is depressed first, the controller 177 may start driving the motor 2 at low speed, and then change the speed of the motor 2 to higher speed when switching the clutch mechanism 45 to the transmission-enabled state in response to the spindle 3 being pressed rearward. Likewise, for example, when the detecting mechanism 5 detects that the locator 15 is located in the rearmost position, the controller 177 may switch the clutch mechanism 45 to the transmission-disabled state and thereby stop the rotational driving of the spindle 3, and thereafter when the trigger 173 is released and the switch 174 is turned off, the controller 177 may stop driving the motor 2.

Further, the controller 177 may start driving the motor 2 only in response to the spindle 3 being pressed rearward, regardless of whether or not the trigger 173 is depressed (whether the switch 174 is on or off). Specifically, when a pressing force measured by the force sensor 37 exceeds a specified threshold, the controller 177 may start driving the motor 2 even if the switch 174 is in the off state. Further, in a case where the clutch mechanism 45 is provided, the clutch mechanism 45 may also be switched to the transmission-enabled state at the timing of driving the motor 2. In the present modification, a user can start the screw-driving operation simply by pressing the screw 97 engaged with the driver bit 90 against the workpiece 99. Further, the screwdriver 1 may be configured to operate in selected one of operation modes, which include a first mode of starting rotational driving of the spindle 3 in response to both the trigger 173 being depressed and the spindle 3 being pressed rearward, and a second mode of starting rotational driving of the spindle 3 only in response to the spindle 3 being pressed rearward.

Further, the screwdriver 1 does not have to have the trigger 173 (and the switch 174) as an operating member for inputting an instruction to start driving the motor 2. In this case, like in the above-described modification, the controller 177 may start driving the motor 2 only in response to the spindle 3 being pressed rearward and thereby start rotational driving of the spindle 3. Further, in a case where the clutch mechanism 45 is provided, the clutch mechanism 45 may also be switched to the transmission-enabled state at the timing of driving the motor 2. In the present modification, a user can also start the screw-driving operation simply by pressing the screw 97 engaged with the driver bit 90 against the workpiece 99.

Furthermore, when the rotating direction of the motor shaft 23 (the spindle 3) is set to the reverse direction (the screw loosening direction), the controller 177 may start driving the motor 2 in response to the spindle 3 being pressed rearward or the locator 15 being moved up to the rearmost position, regardless of whether or not the trigger 173 is depressed (whether the switch 174 is on or off). Specifically, when a pressing force measured by the force sensor 37 exceeds a specified threshold, or when the position sensor 51 detects the magnet 53, the controller 177 may start driving the motor 2. Further, in a case where the clutch mechanism 45 is provided, the clutch mechanism 45 may also be switched to the transmission-enabled state at the timing of driving the motor 2. As described above, when the driver bit 90 is engaged with the screw 97 screwed into the workpiece 99, a rearward pressing force may be applied to the spindle 3 via the driver bit 90, or the locator 15 may be pushed rearward by the workpiece 99. In the present modification, the screw-loosening operation can also be started at appropriate timing.

Further, the clutch mechanism 45 may be changed to a mechanical clutch mechanism (such as a claw (dog) clutch mechanism or friction clutch mechanism), in place of the electromagnetic clutch. In this case, the clutch mechanism may be switched between the transmission-enabled state and the transmission-disabled state (in other words, between an engaged state and a disengaged state of a driving member and a driven member), for example, via an actuator (such as a solenoid) which is electrically actuated by the controller 177. Like an electromagnetic clutch, the clutch mechanism of the present modification can be electrically switched between the transmission-enabled state and the transmission-disabled state by the controller 177.

Alternatively, the spindle 3 may be supported so as to be movable in the front-rear direction relative to the body housing 11. In this case, the mechanical clutch mechanism may be switched from the transmission-disabled state to the transmission-enabled state, in response to the spindle 3 being pressed rearward via the screw 97 and the driver bit 90 and moved rearward to a specified position. The force sensor 37 may be omitted in this case since the clutch mechanism is mechanically operated in response to the movement of the spindle 3. In this case, in the screw-driving operation, the controller 177 may be configured to start driving the motor 2 in response to the trigger 173 being depressed, and when the spindle 3 is moved rearward to the specified position and the clutch mechanism is switched to the transmission-enabled state, rotational driving of the spindle 3 is started. The rotational driving of the spindle 3 may be stopped when the controller 177 stops driving the motor 2, for example, based on the detection result of the detecting mechanism 5.

In the above-described embodiment, as an operating member for inputting an instruction to start driving the motor 2, the trigger 173 is employed which keeps the switch 174 in the off state when not depressed and keeps the switch 174 in the on state while being kept depressed. In a case where the trigger 173 is employed as the operating member, for example, the controller 177 may be configured to detect a depressing amount (a pulling amount or a displacement from the initial position) of the trigger 173, and change the rotational speed of the motor 2 according to the detected depressing amount. The operating member is not limited to the trigger 173, but it may be any other type of operating member or switch, including a push-button type switch which can be turned on and off on every depressing operation and a switch of dial type, slide type or toggle type which can be turned on and off according to the position selected by a user's operation. It is to be noted that the user's operation of these operating members shall be construed as being equivalent to the depressing operation of the trigger 173.

The structure for detecting the front-rear position of the locator 15 and the structure for detecting that the spindle 3 is pressed rearward are not limited to the detecting mechanism 5 and the force sensor 37 of the above-described embodiment, respectively. Further, arrangement positions of these structures can be appropriately changed. For example, although a magnetic field detection type sensor is employed for the detecting mechanism 5 in the above-described embodiment, any other type of sensor (including an optical sensor such as a photointerrupter) or a mechanical switch may be employed instead. Likewise, when the spindle 3 is configured to be movable in the front-rear direction, a non-contact type sensor (such as a magnetic field detection type sensor and an optical sensor) or a mechanical switch may be employed as the structure for detecting that the spindle 3 is pressed rearward.

Further, the structures and arrangement of the body housing 11, the handle housing 171, the motor 2 and the spindle 3 can be appropriately changed. For example, an alternate current motor which is powered by an external power source may be employed as the motor 2, in place of the direct current brushless motor which is powered by the rechargeable battery 95.

Correspondences between the features of the above-described embodiment and the modifications and the features of the invention are as follows. The screwdriver 1 is an example that corresponds to the "screw driving tool". The driver bit 90 is an example that corresponds to the "tool accessory". The body housing 11 is an example that corresponds to the "housing". The motor 2 is an example that corresponds to the "motor". The drive axis A1 is an example that corresponds to the "drive axis". The spindle 3 is an example that corresponds to the "spindle". The locator 15 is an example that corresponds to the "locator". The detecting mechanism 5 (position sensor 51) is an example that corresponds to the "first detecting mechanism". The controller 177 is an example that corresponds to the "controller". The trigger 173 is an example that corresponds to the "operating member". The changeover switch 12 is an example that corresponds to the "direction-selecting member". The force sensor 37 is an example of the "second detecting mechanism". The clutch mechanism 45 is an example that corresponds to the "clutch mechanism".

In view of the nature of the present invention and the above-described embodiment, the following structures (aspects) are provided. One or more of the structures may be employed in combination with the screwdriver 1 of the embodiment and its modifications, or in combination with the claimed invention.

(Aspect 1)

The controller may be configured to:

start driving the motor in response to the spindle being pressed rearward via the tool accessory, thereby starting rotational driving of the spindle in the forward direction, and stop driving the motor when the detecting mechanism detects that the locator is located in the specified position, thereby stopping rotational driving of the spindle in the forward direction.

According to the present aspect, the timing of starting and stopping rotational driving of the spindle (turning of the screw with the tool accessory) can be controlled only by controlling driving of the motor. Therefore, it is not necessary to provide the clutch mechanism on the power transmission path from the motor to the spindle, so that the screw driving tool can be simplified in structure and reduced in weight.

(Aspect 2)

The controller may be configured to start driving the motor only in response to the operating member being depressed and stop driving the motor only in response to the operating member being released when the selected rotating direction is the reverse direction.

According to the present aspect, in the screw-loosening operation in which the spindle is rotationally driven in the reverse direction, driving of the motor can be controlled regardless of whether or not the operating member is depressed and regardless of the detection result of the detecting mechanism. Therefore, a user can give an instruction to start or stop the screw-loosening operation only by operating the operating member.

(Aspect 3)

The clutch mechanism may be an electromagnetic clutch.

According to the present aspect, the state of the clutch mechanism can be promptly switched by the controller.

(Aspect 4)

The detecting mechanism may be disposed within the housing.

According to the present aspect, the detecting mechanism can be protected by the housing, thereby reducing the possibility of malfunctioning.

(Aspect 5)

The screw driving tool as defined in claim 3 may further include a pressing-force-detecting mechanism configured to detect a rearward pressing force applied to the spindle, and the controller may be configured to start driving the motor based on the pressing force detected by the pressing force detecting mechanism.

According to the present aspect, the controller can appropriately start driving the motor based on the detection result of the pressing force detecting mechanism.

(Aspect 6)

The screw driving tool as defined in claim 7 may further include a pressing-force-detecting mechanism configured to detect a rearward pressing force applied to the spindle, and the controller may be configured to electrically switch the clutch mechanism to the transmission-enabled state based on the pressing force detected by the pressing force detecting mechanism.

According to the present aspect, the controller can switch the clutch mechanism to the transmission-enabled state based on the detection result of the pressing force detecting mechanism, thereby starting rotational driving of the spindle. The force sensor 37 is an example that corresponds to the "pressing-force-detecting mechanism" according to aspects 5 and 6 above.

DESCRIPTION OF NUMERALS

1: screwdriver, 2: motor, 3: spindle, 4: driving mechanism, 5: detecting mechanism, 10: body, 11: body housing, 12: changeover switch, 15: locator, 16: biasing member, 17: handle, 21: rotor, 23: motor shaft, 24: pinion gear, 31: bearing, 32: bearing, 33: bearing, 35: cap, 36: thrust bearing, 37: force sensor, 41: intermediate gear member, 45: clutch mechanism, 51: position sensor, 53: magnet, 55: actuation rod, 57: biasing member, 90: driver bit, 95: battery, 97: screw, 99: workpiece, 110: driving-mechanism-housing part, 111: front end surface, 115: locator-mounting part, 116: groove, 117: stopper member, 118: protruding part, 151: base part, 152: recess, 153: front wall, 154: rear wall, 155: flange, 157: adjusting part, 171: handle housing, 172: grip part, 173: trigger, 174: switch, 176: controller-housing part, 177: controller, 179: battery-mounting part, 231: bearing, 233: bearing, 301: bit-insertion hole, 411: gear teeth, 451: coil, 453: holding member, 455: driving member, 457: driven member, 459: flat spring, 501: housing space, 503: opening, A1: drive axis

What is claimed is:

1. A screw driving tool configured to drive a screw into a workpiece with a tool accessory, the screw driving tool comprising:
    a housing extending in a front-rear direction of the screw driving tool;
    a motor housed in the housing;
    a spindle that is an elongate member extending in the front-rear direction along a drive axis and supported by the housing so as to be rotatable around the drive axis, the spindle having a front end portion configured to detachably hold the tool accessory, the spindle being configured to be rotationally driven at least in a forward direction by power transmitted from the motor, the forward direction corresponding to a direction of tightening the screw with the tool accessory;
    a locator slidably mounted on a front end portion of the housing;
    a first detecting mechanism configured to detect a position of the locator in the front-rear direction relative to the housing; and
    a controller configured to control driving of the motor, wherein:
    the locator, the housing and the spindle are configured such that an entirety of the locator moves in the front-rear direction relative to the housing and the spindle when the locator engages the workpiece during driving of the screw and the workpiece applies a force against the locator to move the locator along the drive axis relative to the housing during the driving of the screw;
    the locator being configured to define a depth to which the screw is driven into the workpiece;
    rotational driving of the spindle in the forward direction is started in response to the spindle being pressed rearward via the tool accessory; and
    the rotational driving of the spindle in the forward direction is stopped when the first detecting mechanism detects that the locator is in a specified position due to the force applied by the workpiece against the locator, the specified position being located rearward of a most forward position within a moving range of the locator.

2. The screw driving tool as defined in claim 1, further comprising:
    an operating member configured to be activated by a user, wherein the controller is configured to start driving the motor when the operating member is activated and the spindle is pressed rearward via the tool accessory.

3. The screw driving tool as defined in claim 1, wherein the controller is configured to stop driving the motor when the first detecting mechanism detects that the locator is in the specified position.

4. The screw driving tool as defined in claim 1, further comprising:
    an operating member configured to be activated by a user; and
    a direction-selecting member configured to be operated by the user to select a rotating direction of the spindle between the forward direction and a reverse direction, the reverse direction corresponding to a direction of loosening the screw with the tool accessory,
    wherein the controller is configured to:
    start driving the motor when the operating member is activated and the spindle is pressed rearward via the tool accessory, in a case where the selected rotating direction is the forward direction, thereby starting rotational driving of the spindle in the forward direction, and
    start driving the motor only in response to the operating member being activated, in a case where the selected rotating direction is the reverse direction, thereby starting rotational driving of the spindle in the reverse direction.

5. The screw driving tool as defined in claim 1, further comprising:
    a second detecting mechanism configured to detect that the spindle is pressed rearward.

6. The screw driving tool as defined in claim 5, wherein the controller is configured to:
    start driving the motor in response to the spindle being pressed rearward via the tool accessory, thereby starting rotational driving of the spindle in the forward direction, and
    stop driving the motor when the first detecting mechanism detects that the locator is located in the specified position, thereby stopping rotational driving of the spindle in the forward direction.

7. The screw driving tool as defined in claim 1, further comprising:
a clutch mechanism in a transmission path of the power from the motor to the spindle and configured to be switched between a transmission-enabled state and a transmission-disabled state, the clutch mechanism being configured such that the power of the motor can be transmitted to the spindle in the transmission-enabled state and such that the power of the motor cannot be transmitted to the spindle in the transmission-disenabled state.

8. The screw driving tool as defined in claim 7, wherein the clutch mechanism is configured to be held in the transmission-disabled state when the spindle is not pressed rearward, and to be switched to the transmission-enabled state in response to the spindle being pressed rearward via the tool accessory.

9. The screw driving tool as defined in claim 7, wherein:
the clutch mechanism is configured to be electrically switched between the transmission-enabled state and the transmission-disabled state, and
the controller is configured to electrically switch the clutch mechanism to the transmission-disabled state when the first detecting mechanism detects that the locator is in the specified position.

10. The screw driving tool as defined in claim 9, further comprising:
a second detecting mechanism configured to detect that the spindle is pressed rearward, and
wherein the controller is configured to electrically switch the clutch mechanism to the transmission-enabled state when the second detecting mechanism detects that the spindle is pressed rearward.

11. The screw driving tool as defined in claim 9, wherein the clutch mechanism includes an electromagnetic clutch.

12. The screw driving tool as defined in claim 1, further comprising:
an operating member configured to be activated by a user; and
a direction-selecting member configured to be operated by the user to select a rotating direction of the spindle between the forward direction and a reverse direction, the reverse direction corresponding to a direction of loosening the screw with the tool accessory,
wherein the controller is configured to start driving the motor only in response to the operating member being activated and stop driving the motor only in response to the operating member being deactivated in a case where the selected rotating direction is the reverse direction.

13. The screw driving tool as defined in claim 1, wherein the first detecting mechanism is within the housing.

14. The screw driving tool as defined in claim 1, further comprising a biasing member between the housing and the locator, the biasing member being configured to always bias the locator forward, toward a most forward position of the locator relative to the front end portion in a range of movement of the locator relative to the housing.

15. The screw driving tool as defined in claim 1, wherein the locator includes:
a first part slidably mounted on the front end portion of the housing so as to be movable in the front-rear direction relative to the housing and the spindle; and
a second part coupled to the first part such that an amount of forward protrusion of the second part from the first part is adjustable, and
wherein the first part and the second part are configured to move together as one unit in the front-rear direction relative to the housing and the spindle when the second part engages the workpiece and the workpiece applies a force against the second part.

16. The screw driving tool as defined in claim 15, further comprising a biasing member between the housing and the first part, the biasing member being configured to bias the entirety of the locator via the first part toward a most forward position of the locator relative to the front end portion in a range of movement of the locator relative to the housing.

17. The screw driving tool as defined in claim 14, wherein:
a first one of the housing and the locator includes a stopper,
a second one of the housing and the locator includes a first contact part and a second contact part,
the first contact part is in front of the stopper and the second contact part is behind the stopper and are spaced such that the first contact part and the second contact part allow the stopper to move in the front-rear direction between the first contact part and the second contact part, and
the first contact part and the second contact part are configured to define a range in which the locator is movable in the front-rear direction relative to the housing by abutting on the stopper.

* * * * *